United States Patent
Beggiora et al.

(10) Patent No.: US 9,284,044 B2
(45) Date of Patent: Mar. 15, 2016

(54) DEVICE AND METHOD FOR ACTIVE CONTROL OF A FORCE FEEDBACK FOR A CONTROL DEVICE

(71) Applicant: SAGEM DEFENSE SECURITE, Boulogne-Billancourt (FR)

(72) Inventors: Geoffrey Beggiora, Boulogne-Billancourt (FR); Jerome Piaton, Boulogne-Billancourt (FR); Guillaume Mercier, Boulogne-Billancourt (FR); Yann Vendenbaviere, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/394,466

(22) PCT Filed: Apr. 15, 2013

(86) PCT No.: PCT/EP2013/057842
§ 371 (c)(1),
(2) Date: Oct. 14, 2014

(87) PCT Pub. No.: WO2013/156451
PCT Pub. Date: Oct. 24, 2013

(65) Prior Publication Data
US 2015/0081139 A1    Mar. 19, 2015

(30) Foreign Application Priority Data

Apr. 16, 2012  (FR) ...................................... 12 53482

(51) Int. Cl.
| | |
|---|---|
| *B64C 13/04* | (2006.01) |
| *G01C 23/00* | (2006.01) |
| *B64C 13/46* | (2006.01) |
| *G06F 3/01* | (2006.01) |
| *G06F 3/038* | (2013.01) |

(52) U.S. Cl.
CPC .................. *B64C 13/46* (2013.01); *B64C 13/04* (2013.01); *G06F 3/016* (2013.01); *G06F 3/038* (2013.01)

(58) Field of Classification Search
CPC ......................................................... G08G 5/08
See application file for complete search history.

(56) References Cited

U.S. PATENT DOCUMENTS

| | | | |
|---|---|---|---|
| 5,735,490 A * | 4/1998 | Berthet et al. ................. | 244/223 |
| 2001/0045941 A1 * | 11/2001 | Rosenberg et al. ........... | 345/161 |
| 2005/0080495 A1 | 4/2005 | Tessier et al. | |

FOREIGN PATENT DOCUMENTS

| | | |
|---|---|---|
| EP | 2 279 941 A1 | 2/2011 |
| FR | 2 708 112 A1 | 1/1995 |
| WO | WO 98/37484 | 8/1998 |

*Primary Examiner* — Helal A Algahaim
*Assistant Examiner* — Michael Fouche
(74) *Attorney, Agent, or Firm* — Blakely Sokoloff Taylor & Zafman LLP

(57) ABSTRACT

The invention concerns a device for the active control of a force feedback for a control device, comprising a calculator, a position sensor (3) configured to provide the calculator with an effective position signal (Pm) of the control device, and an actuator (2) ensuring the displacement of the control device at the command of the calculator, the calculator being configured to use the effective position signal and modulate a setpoint current (Ic) delivered to the actuator to ensure the position feedback of the displacement of the control device, characterized in that the calculator is further configured to create at least one saturation terminal (Bsat+, Bsat−) according to a predetermined function of the value of the effective position signal of the position/force law kind, and to saturate the setpoint current using the at least one saturation terminal.

9 Claims, 5 Drawing Sheets

DEVICE AND METHOD FOR ACTIVE CONTROL OF A FORCE FEEDBACK FOR A CONTROL DEVICE

FIELD OF THE INVENTION

The field of the invention is that of active control of a force feedback for a steering member, such as an aircraft steering mini-handle, especially a helicopter. The invention relates more particularly to the conception of a mini handle with a force feedback law applied to the mini handle so that the pilot senses a force when it acts on the latter.

BACKGROUND OF THE INVENTION

Passive mini handles are known for which the force is restored by mechanical elements (based on a spring, hydraulic brake, . . . ). It eventuates that the mechanical pieces have to be dimensioned as per the force feedback to be applied. Passive solutions are therefore of fixed design by nature. They often further present degraded precision due to wear of mechanical pieces.

Active mini handles having a control system of force law steered by control electronics are known. These active solutions have the advantage of using electromechanical elements, and offer the possibility of modifying the software which sets the force feedback to apply feedbacks of different forces.

Document FR 2 708 112 A1 describes an active solution executing control of the position of the handle relative to the force applied to the latter. With this solution, at the time when the pilot releases the handle, the value of the force sensor is at zero and therefore the current reference sent to the motor increases, causing sharp acceleration of the motor. The latter effectively provides the maximal torque at given speed to feedback to its reference position (typically to the neutral point of origin). There is therefore a risk that the feedback of the handle to the original position might not happen correctly but instead exceeds the original position or even engenders oscillations about the origin, which can prove harmful to system security.

EXPLANATION OF THE INVENTION

The aim of the invention is to propose a solution for controlling a mini handle, which is reliable, reproducible, precise, adaptable, with the possibility of reproducing laws of complex and modifiable force without impact on the overall design (parametrable), of minimal bulk and inexpensive.

For this reason, the invention proposes a device for active control of a force feedback for a steering member, comprising a calculator, a position sensor configured to provide the calculator with an effective position signal of the steering member, and an actuator for displacement of the steering member on command from the calculator, the calculator being configured to exploit the effective position signal and modulate a setpoint current delivered to the actuator to ensure controlled displacement in position of the steering member, characterized in that the calculator is also configured to develop at least one saturation terminal according to a predetermined function of the value of the effective position signal of position/force law type, and saturate the setpoint current by means of the at least one saturation terminal.

Some preferred, though non-limiting, aspects of this device are the following:

the calculator provides position control in cascade of the actuator, and the position control in cascade is executed by means of a main position control loop and an internal secondary speed control loop;

the calculator further comprises a speed estimator executing the effective position signal to provide an effective speed signal, and the calculator further develops the at least one saturation terminal also according to a predetermined function of the value of the effective speed signal of speed/force law type;

it also comprises a force sensor configured to provide an actual force signal exerted by a user on the steering member and in which the calculator is also configured to calculate a force error corresponding to the difference between the actual force signal and the at least one saturation terminal and to correct the setpoint current as a function of the force error signal;

correction of the setpoint current consists of injecting the force error onto the saturated setpoint current;

correction of the setpoint current consists of injecting the force error onto the at least one saturation terminal of the setpoint current;

the calculator is configured to adjust a level of authority of the correction of the setpoint current as a function of the force error.

According to another aspect, the invention relates to an aircraft comprising an aircraft control surface, a steering member for driving the aircraft control surface, and a device for active control of a force feedback for the steering member according to the invention.

According to yet another aspect, the invention relates to a method for active control of a force feedback for a steering member whereof displacement is ensured by an actuator on command from a calculator, in which an effective position of the steering member is measured and modulation of a setpoint current delivered to the actuator is executed to ensure position control of the displacement of the steering member, characterized in that at least one saturation terminal is developed according to a predetermined function of the value of the measured effective position of position/force law type, and the setpoint current is saturated at a high and low limit by means of the at least one saturation terminal.

BRIEF DESCRIPTION OF DRAWINGS

Other aspects, aims and advantages of the present invention will emerge more clearly from the following detailed description of preferred embodiments of the latter, given by way of non-limiting example, and given in reference to the appended drawings, in which.

DETAILED DESCRIPTION OF THE INVENTION

The invention relates to a device for active control of a force feedback for a steering member of a vehicle, especially a vehicle comprising an aerodynamic or hydrodynamic control surface. The invention extends to a method for active control of a force feedback for such a steering member.

The invention preferably applies to the active control of a force feedback for a mini-handle (or "stick") for piloting an aircraft, especially a helicopter. The example of such a mini-handle of a helicopter will be used hereinbelow. The invention is not however limited to this embodiment, and hereinbelow in a wide sense the term "steering" designates the piloting of a vehicle by a human pilot maneuvering a steering member, such as a handle, a gear shift, a steering wheel, a pedal, etc.

In conventional terms per se, a steering device of a vehicle comprises a steering member connected to a steering member (especially a control surface) and a motorised actuator connected to the steering member to simulate specific dynamic behaviour of the steering member to create a reminder of neutral and an artificial sensation of resistant force when the pilot acts on the steering member. The device according to the invention comprises a calculator and an actuator for displacement of the steering member on command from the calculator.

Figure 1:
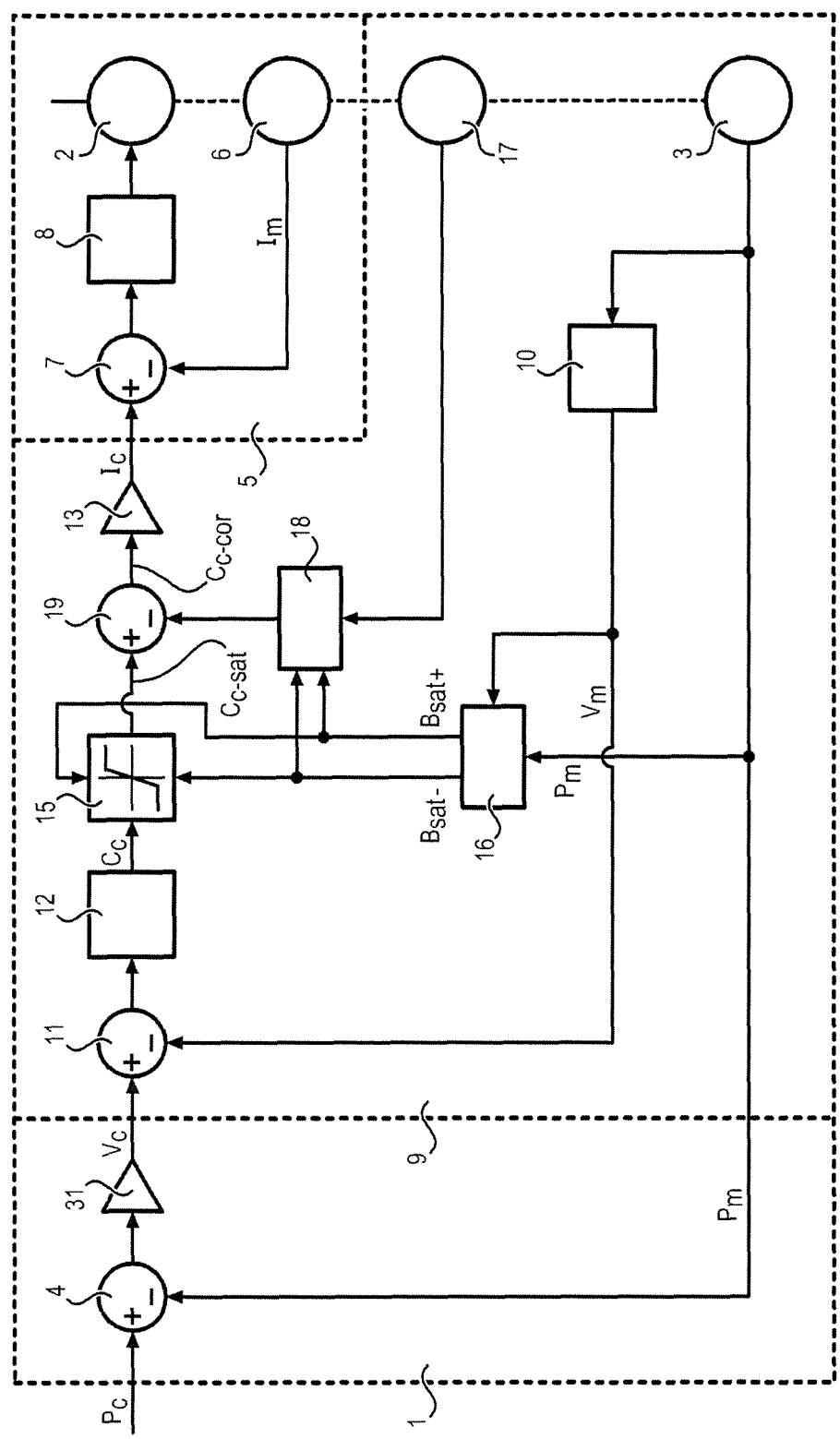
FIG. 1 illustrates a first possible embodiment of a control device according to the invention.
Figure 2:
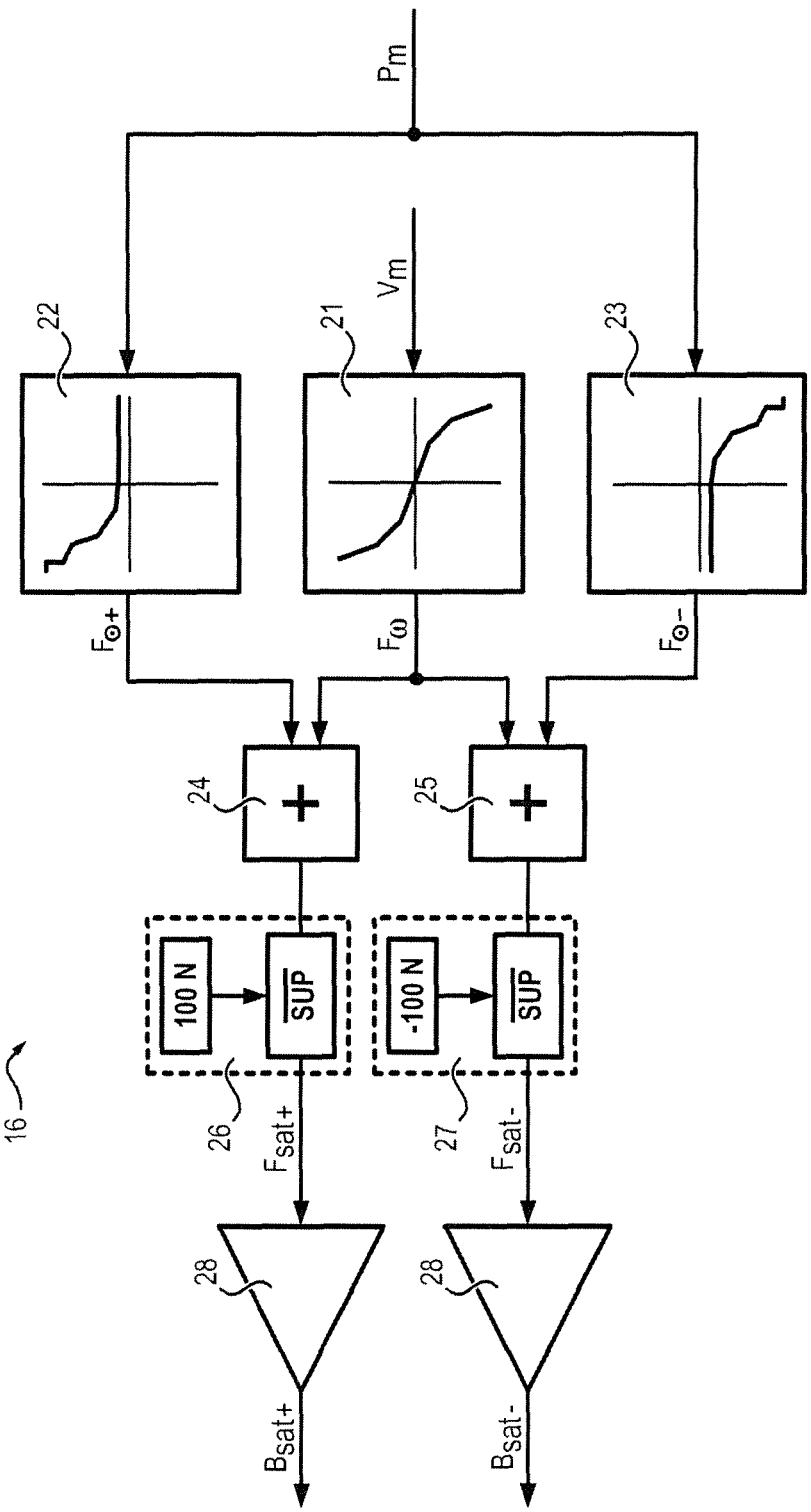
FIG. 2 illustrates a possible embodiment of the development of two saturation terminals.

In reference to FIGS. 1 and 2 illustrating two possible embodiments of a device according to the invention and in which the common elements bear the same reference numerals, the actuator is for example a motor 1 of brushless type connected to the mini-handle by means of a reducer. The calculator supplies a motor command which rests preferably on three nested regulation loops: a main position loop of the motor 1, an internal speed loop of the motor 9 and a current loop 5 which is directly the image of the torque motor. The calculator executes a position control in cascade with the main position control loop 1 and the internal secondary speed control loop 9 to modulate a setpoint current Ic delivered to the current loop of the motor. But it is evident that the command motor supplied by the calculator cannot exploit an internal loop speed.

The motor is controlled in position so that the mini handle always feedbacks to a set position Pc, which is for example the vertical position. As soon as the pilot wants to move the mini handle away from this position, the motor applies torque to feedback it to its initial position so that the pilot senses a force in the mini handle.

The position loop 1 comprises a position sensor 3 (position sensor of the mini handle, or position sensor of the motor as shown which has the advantage of better resolution) which supplies the calculator with an effective position signal Pm of the steering member. The position loop 1 comprises a differentiator 4 which makes the difference between the set position Pc and the effective position signal Pm, and a position controller 31 which develops a reference speed Vc exploited by the speed loop 9.

The current loop 5 comprises a current sensor 6 (in reality one sensor per phase) measuring the effective current Im circulating in the motor, a differentiator 7 which executes the difference between the setpoint current Ic and the effective current Im, and a current regulator 8. The current controller 8 can especially be configured to perform a vectorial command of the brushless motor according to which a statoric magnetic field is applied always perpendicular to a rotoric magnetic field so that the motor delivers maximum torque at given speed. For this, a common reference point is defined on the stator and the rotor and the motor is controlled by references in this common reference point.

The speed loop 9 comprises a speed estimator 10, typically a splitter 10 executing the effective position signal Pm delivered by the position sensor 3 to provide an effective speed signal Vm. As a variant, the speed loop can comprise a speed sensor.

The speed loop 9 comprises a differentiator which executes the difference between the reference speed Vc and the effective speed signal Vm, and a speed regulator 12 which develops a torque setpoint Cc (FIG. 1) or a speed regulator 14 which directly develops a setpoint current (FIG. 2).

The control executed within the scope of the invention exploits position, and optionally speed information. This proves advantageous to the extent where command of the motor and therefore the position of the handle are not subject to the force applied, which does away with the problem of the handle release which with a force sensor causes sharp acceleration of the motor.

Figure 4:
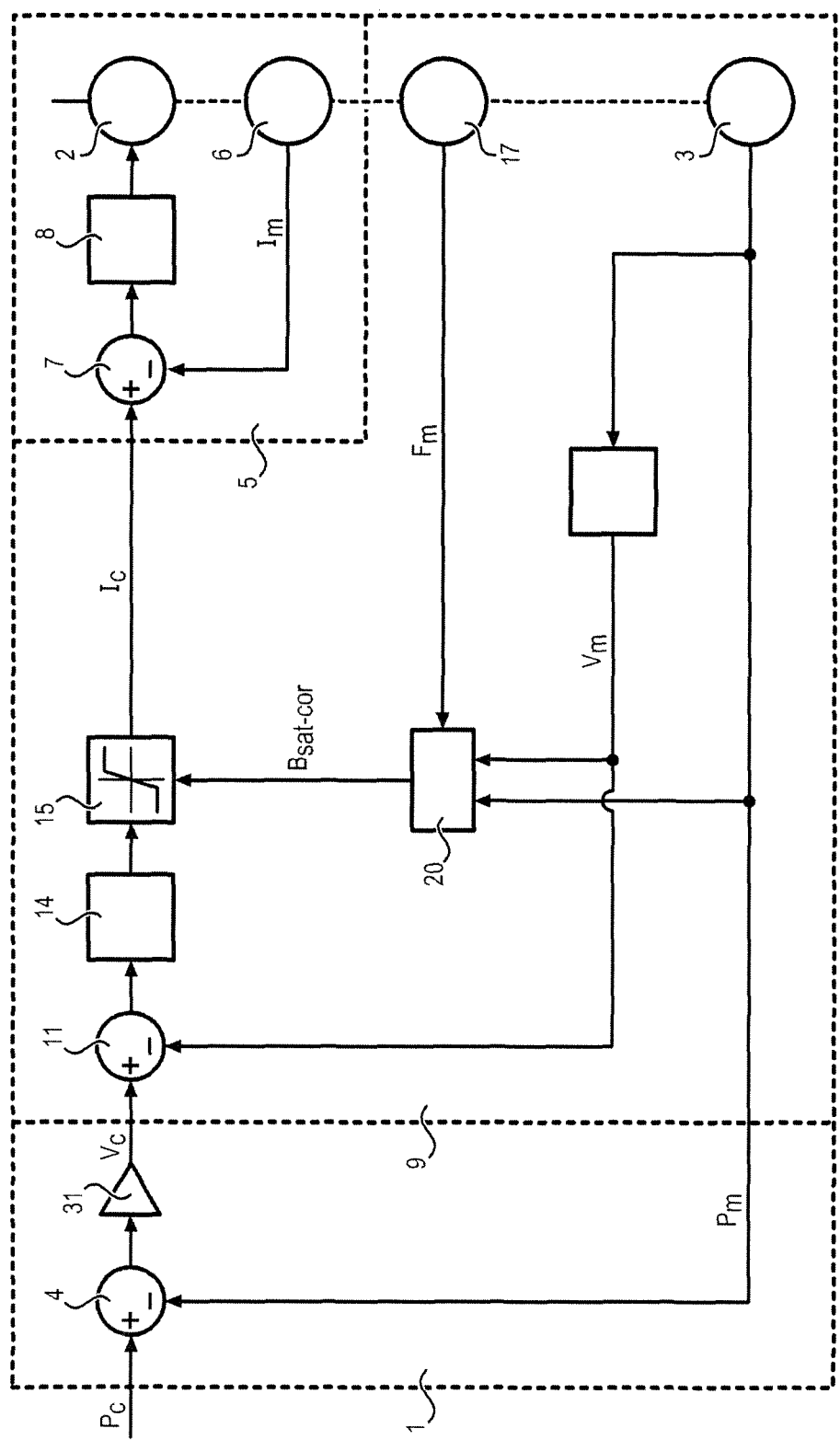
FIG. 4 illustrates a second possible embodiment of control device according to the invention.

In classic position/speed/current control, it is the setpoint current (directly image of the torque setpoint of torque Cc, via a single multiplier 5 as shown on the FIG. 1) at output of the speed regulator which is executed by the current loop. The invention proposes per se to saturate the setpoint current exiting from the speed regulator and serving as the vectorial command of the motor 2. Saturation occurs at the output of the speed regulator 12, 14 by means of a limiter 15 receiving at least one saturation terminal Bsat+, Bsat−, Bsat-cor from a saturation unit 16, 20. In FIG. 1, the limiter 15 receives a torque setpoint Cc and delivers a saturated torque setpoint Cc-sat in high and low limit via the saturation terminals Bsat+ and Bsat−. The saturated torque setpoint Cc-sat is then converted into saturated setpoint current Ic. In FIG. 4, the limiter receives from the limiter 14 a setpoint current and delivers the saturated setpoint current in high and low limit via the saturation terminal Bsat-cor.

Figure 3:
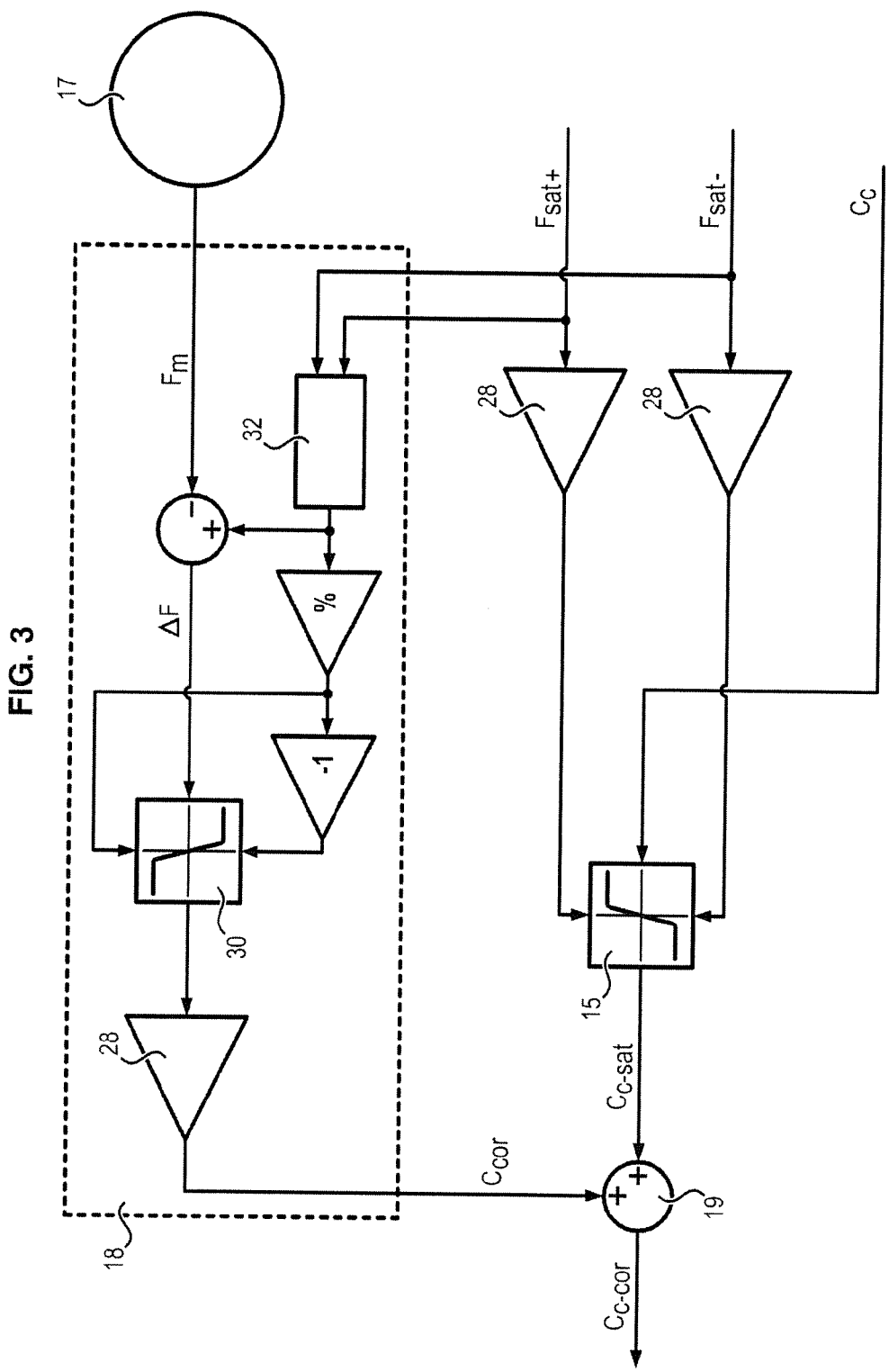
FIG. 3 illustrates a possible embodiment of a correction which can be made to the saturated setpoint current of the first embodiment.

In reference to FIG. 3, the setpoint current is more precisely saturated by at least one saturation terminal coming from one or more parametrable tables of law of force 21-23. It is ensured that the motor delivers the torque described by the force table or force tables, and not the maximum torque given by the vectorial command. The at least one saturation terminal is more precisely calculated according to a predetermined function of the value of the effective position signal of position/force law type; it comes from a deflection table which for an angular input position gives an output force. So, as soon as the pilot moves the mini handle, the motor will provide maximal torque at given speed to feedback to origin and this torque is saturated by the torque defined by the deflection table so that the pilot senses the preferred force in the handle.

In a possible embodiment illustrated in FIG. 3, two saturation terminals Bsat+, Bsat− are developed to produce saturations not necessarily symmetrical in high and low limit of the setpoint current. Two deflection tables 22, 23 are used to achieve this. A first deflection table 22 is utilised to develop the high saturation terminal Bsat+: it provides a positive force Fθ+ when the position of the mini handle is negative. It is provided advantageously that this table supplies a breakout force of positive non-zero value when the position of the mini handle is positive, corresponding to the force to be exerted by the pilot to positively shift the mini handle from its initial position. The second deflection table 23 is used to develop the low saturation terminal Bsat−: it provides a negative force Fθ− when the position of the mini handle is positive. It also has a breakout level for negatively shifting the mini-handle from its initial position.

The profiles of deflection tables 22, 23 are not necessarily symmetrical. It is possible that a pilot has more force by pushing than pulling the mini handle as he can apply all his body weight when pushing. It can also be that the pilot has more force using his right hand to shift an object to the left than to the right.

In a variant embodiment, an amortisation schedule which provides an output force Fω for an intake speed is also implemented. This table exerts a greater force on the mini handle if the latter is shifted rapidly by the pilot. This table also slows the feedback to origin of the mini handle whenever the handle of the pilot is released.

As shown in FIGS. 1 and 2, the saturation unit 16 exploits the effective position signal Pm and the effective speed signal, and circulates this information in the tables of force law 21-23 each of which produces a force value Fω, Fθ+, Fθ−. The force value Fω originating from the amortisation schedule 21 with each of the force values Fθ+, Fθ− originating from the deflection tables 22, 23 is added by means of adders 24, 25. The result provides high and low saturation forces Fsat+, Fsat−, optionally after limitation 26, 27 at a maximal admissible force value (at 100N and −100N in the example). These high and low saturation forces Fsat+, Fsat− are then converted 28 into high and low saturation terminals Bsat+, Bsat− (saturation terminals in torque for the example of FIGS. 1 and 2).

Figure 5:
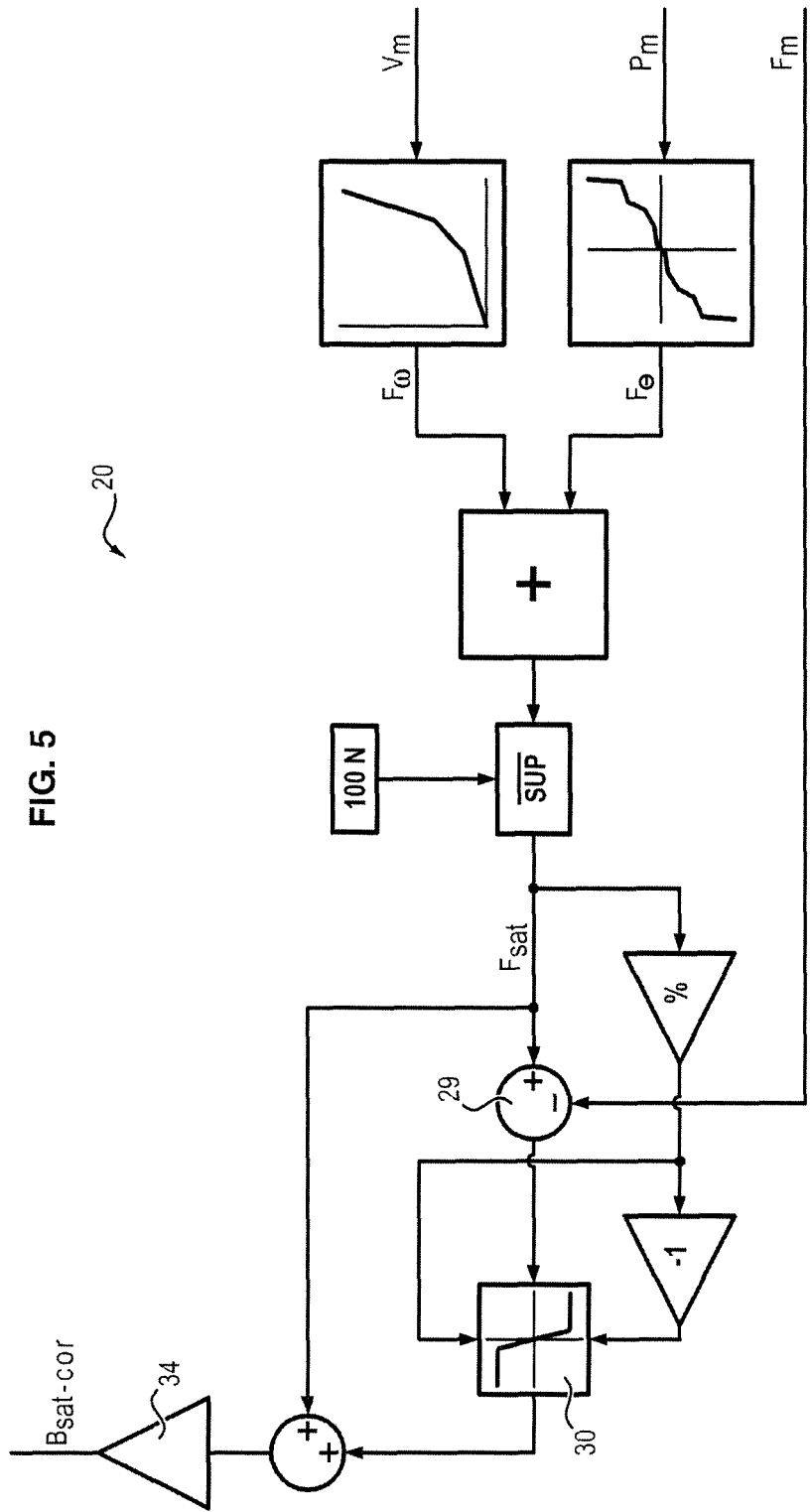
FIG. 5 illustrates a possible embodiment of the development of a saturation terminal within the scope of the second embodiment.

As shown in FIG. 5, only a saturation terminal which will be applied in high and low limit at the same time can be calculated. Only a single deflection table 32 is implemented whereof the force output can be added to the force output of an amortisation schedule 21 to provide, after any limitation to an admissible maximal value, a saturation force Fsat. As also shown in FIGS. 4 and 5, this saturation force can be converted (after any correction as described hereinbelow) into a saturation terminal directly in Bsat-cor current.

It is evident from the above that a saturation terminal in torque, current or force can be designated by the same term of "saturation terminal".

In a variant embodiment, the device according to the invention further comprises a force sensor configured to provide an actual force signal Fm exerted by a user on the steering member. The calculator is configured to calculate a force error signal ΔF corresponding to the difference between the actual force signal Fm and a saturation terminal (expressed here in saturation force Fsat+, Fsat−, Fsat) and to correct the setpoint current as a function of the force error signal.

In a first realisation of this variant shown in FIGS. 1 and 3, the force error signal is injected onto the saturated setpoint current (more precisely on the saturated torque setpoint Cc-sat after conversion into a torque error Ccor as shown). In this realisation, correction of the setpoint current by the error measured between the force sensor and the reference after saturation will therefore be applied. The device according to the invention comprises a correction unit 18 receiving the actual force signal Fm supplied by the force sensor 17 and the saturation forces Fsat+, Fsat−. A selector 32 selects one or the other of these forces according to whether the position is positive or negative. A differentiator 29 calculates the force error ΔF, and a converter converts it into torque error Ccor. A differentiator 19 corrects the saturated torque setpoint CC-sat by the torque error Ccor to provide the corrected saturated torque setpoint Cc-cor.

In a second realisation of this variant shown in FIGS. 4 and 5, the force error signal is injected into the at least one saturation terminal of the setpoint current. In this second realisation, the limiter therefore uses at least one saturation terminal integrating the correction of the setpoint current by the error measured between the force sensor and the reference. The device according to the invention comprises a saturation and correction unit 20 for developing such a saturation terminal corrected by the force error. This unit 20 comprises, apart from the elements already described previously in connection with calculation of the saturation force Fsat, a differentiator 29 which calculates the force error ΔF between the measured effective force Fm and the saturation force Fsat, and an adder 33 which adds this force error to the saturation force to produce a saturation terminal Bsat-cor after is passes through a converter 34.

Within the scope of this variant, and as shown in FIGS. 3 and 5, a level of authority of the correction of the setpoint current can also be adjusted as a function of the force error signal ΔF. This adjustment can especially consist of saturating the force error by a percentage of the saturation terminal (here expressed in saturation force Fsat+, Fsat−, Fsat) by means of a limiter 30.

This adjustment of the level of authority of the correction of the setpoint current limits the power of the force sensor, and especially prevents a handle release from causing sharp acceleration of the motor, which would likely damage it.

The invention claimed is:

1. A device for active control of a force feedback for a steering member, comprising a calculator, a position sensor (3) configured to provide the calculator with an effective position signal (Pm) of the steering member, and an actuator (2) ensuring displacement of the steering member on command from the calculator, the calculator being configured to execute the effective position signal and modulate a setpoint current (Ic) delivered to the actuator to ensure position-controlled displacement of the steering member, characterized in that the calculator is also configured to develop at least one saturation terminal (Bsat, Bsat+, Bsat−, Bsat-cor) according to a predetermined function of a value of the effective position signal of position/force law type (21, 23, 32), and to saturate the setpoint current by means of the at least one saturation terminal, wherein the calculator further comprises a speed estimator (10) executing the effective position signal (Pro) to provide an effective speed signal (Vm), and wherein the calculator further develops the at least one saturation terminal according to a second predetermined function of the value of the effective speed signal of speed/force law type (21~31).

2. The device according to claim 1, wherein the calculator provides a position control in cascade of the actuator, the position control in cascade being executed by means of a main position control loop (1) and an internal secondary speed control loop (9).

3. The device according to claim 1 or 2, further comprising a force sensor (17) configured to provide an actual force signal (Fm) exerted by a user on the steering member and wherein the calculator is also configured to calculate a force error (ΔF) corresponding to the difference between the actual force signal and the at least one saturation terminal and to correct the setpoint current as a function of the force error signal.

4. The device according to claim 3, wherein the correction of the setpoint current consists of injecting the force error on the saturated setpoint current (Cc-sat).

5. The device according to claim 3, wherein the correction of the setpoint current consists of injecting the force error on the at least one saturation terminal of the setpoint current.

6. The device according to claims 3, wherein the calculator is configured to adjust a level of authority of the correction of the setpoint current as a function of the force error.

7. The device according to claim 6, wherein the adjustment of the level of authority of the correction of the setpoint current consists of saturating the force error (ΔF) by a percentage of the at least one saturation terminal.

8. An aircraft comprising an aircraft control surface, a steering member for driving the aircraft control surface, and a device for active control of a force feedback for the steering member according to claim 1 or 2.

9. A method for active control of a force feedback for a steering member which displacement is provided by an actuator controlled by a calculator, wherein an effective position of the steering member is measured and modulation of a setpoint current delivered to the actuator is executed to ensure a position control of the displacement of the steering member, characterized in that at least one saturation terminal is developed according to a predetermined function of the value of the measured effective position of position/force law type, and the setpoint current at high and low limit is saturated by means of the at least one saturation terminal, wherein the calculator further comprises a speed estimator executing an effective position signal (Pm) to provide an effective speed signal (Vm), and wherein the calculator further develops the at least one saturation terminal according to a predetermined function of the value of an effective speed signal of speed/force law type.

\* \* \* \* \*

UNITED STATES PATENT AND TRADEMARK OFFICE
CERTIFICATE OF CORRECTION

PATENT NO. : 9,284,044 B2
APPLICATION NO. : 14/394466
DATED : March 15, 2016
INVENTOR(S) : Geoffrey Beggiora et al.

Page 1 of 1

It is certified that error appears in the above-identified patent and that said Letters Patent is hereby corrected as shown below:

On the Title Page, in Item [72] under Inventors, please correct the fourth inventor name; delete "Vendenbaviere" and insert --Vandenbaviere--.

In the Claims,

Column 6, Claim 1, line 32, please delete "(Pro)" and insert --(Pm)--.

Column 6, Claim 1, line 37, please delete "(21 ~ 31)" and insert --(21, 31)--.

Column 6, Claim 3, line 47, please delete "(AF)" and insert --(ΔF)--.

Column 6, Claim 6, line 57, please delete "claims" and insert --claim--.

Signed and Sealed this
Fifth Day of July, 2016

Michelle K. Lee
*Director of the United States Patent and Trademark Office*